J. ABSTERDAM.
PROCESS AND APPARATUS FOR MANUFACTURING ILLUMINATING GAS.
No. 189,166. Patented April 3, 1877.
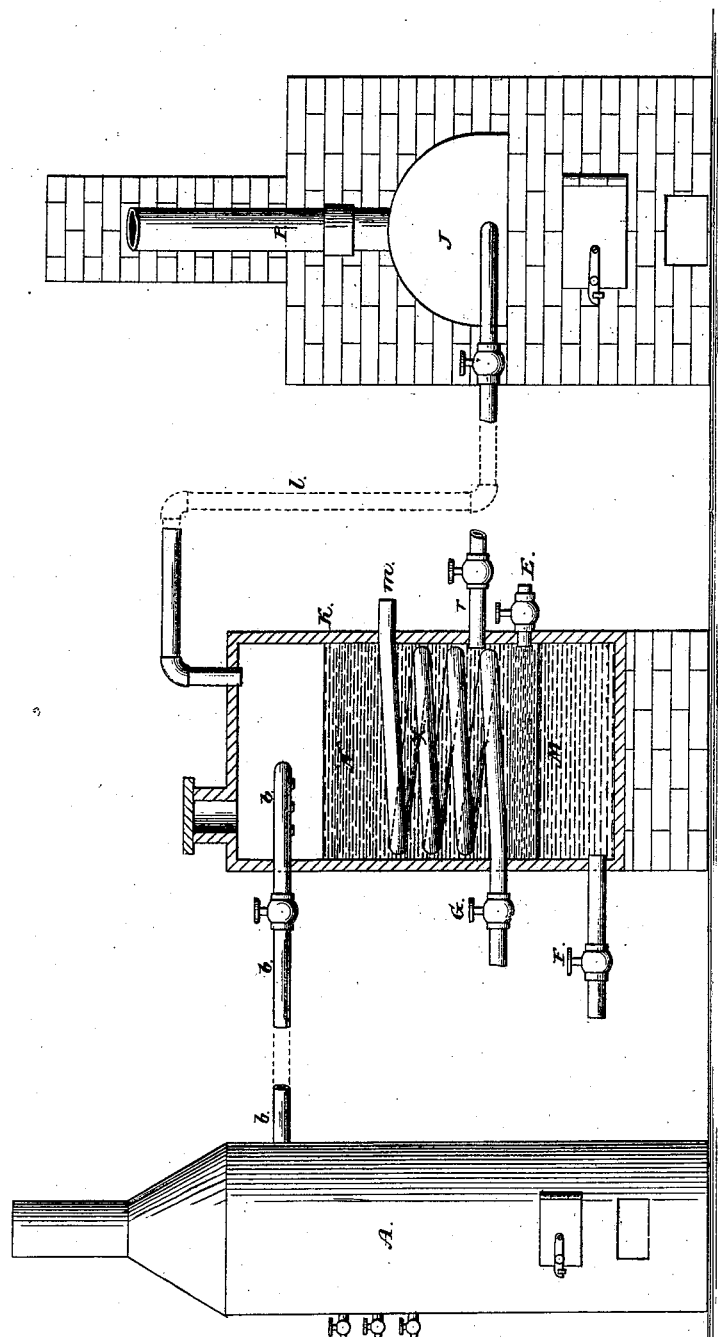

UNITED STATES PATENT OFFICE

JOHN ABSTERDAM, OF NEW YORK, N. Y.

IMPROVEMENT IN PROCESSES AND APPARATUS FOR MANUFACTURING ILLUMINATING-GAS.

Specification forming part of Letters Patent No. 189,166, dated April 3, 1877; application filed August 12, 1875.

*To all whom it may concern:*

Be it known that I, JOHN ABSTERDAM, scientific and mechanical engineer, of the city, county, and State of New York, have invented certain new and useful Improvements in the Process and Apparatus for the Manufacture of Illuminating-Gas; and I do hereby declare the following to be a full, clear, and exact description thereof, which will enable others skilled in the art to which it pertains to make and use the same, reference being had to the accompanying drawings, and to the letters of reference marked thereon, which form a part of this specification.

Heretofore processes and apparatus have been used to produce illuminating-gas wherein steam or other aeriform heated fluid is brought into contact with the surface of liquid hydrocarbon, heated or not, below its surface in a closed vessel, the resulting vapors being carried into a heated retort, where they are converted into a fixed gas.

Great difficulty is experienced in the use of these processes and apparatus on account of the liquid hydrocarbon becoming too rapidly heated, the vapors given off for this reason rapidly increasing in specific gravity until too heavy to be used for illuminating purposes.

The object of my invention is to overcome this difficulty and insure uniformity in specific gravity and candle-power of the gas produced; and it consists in the process of manufacturing a fixed gas by bringing steam in contact with a liquid hydrocarbon which is cooled or refrigerated below its surface, and thence conveying the mixture of steam and hydrocarbon vapor into a heated retort, where it is converted into a fixed gas, whereby the specific gravity and candle-power of the gas is regulated; also, in the apparatus by which the process is carried out.

In the accompanying drawings, forming a part of this specification, I have shown an apparatus for the manufacture of illuminating-gas from liquid hydrocarbons, such as naphtha, gasoline, benzine, petroleum, and the like.

The steam is generated in the boiler A, from which it is conveyed through pipes $b\ b\ b$, which may be provided with apertures to cause the steam to escape in jets to the upper part of a closed vessel or still, K, containing the liquid hydrocarbon N. Within the still K is a coil of pipes, X, located beneath the surface of the liquid hydrocarbon N, connected at one end with a supply or reservoir of cooling fluid, such as water, which is caused to pass through the coil and discharge at the outlet $m$ of the coil, for the purpose of refrigerating or cooling and controlling the temperature of said liquid hydrocarbon.

The still K is charged with the liquid hydrocarbon to about three-fourths of its capacity, and is supplied by means of a pipe, $r$, from tanks elevated or placed under ground. A pipe, $l$, connects the upper part of the still K with a retort, J, connected by a stand-pipe, P, to the hydraulic main.

In using my invention, I heat the retort J to the desired temperature. I then admit steam from the boiler through pipe $b\ b\ b$ upon the surface of the liquid hydrocarbon N in the still K, causing the generation of hydrocarbon vapors, which, mixed with the steam, pass together through the pipe $l$ to the heated retort J, where they are converted into a fixed gas. From the retort J this gas passes through a stand-pipe, P, to the hydraulic main, and thence to the ordinary and well-known condenser, cooler, or washer, whence it is propelled by the exhauster through the station-meter to the gas-holder.

While the steam is generating hydrocarbon vapors, the temperature of the liquid hydrocarbon N is maintained at the point required for producing gas of the desired specific gravity and candle-power, by passing a cooling or refrigerating fluid through the coil X, its flow being controlled by the cock G.

Instead of the coil X, other means of cooling the liquid hydrocarbon may be employed.

The still may be surrounded by a tank or jacket, through which the cooling fluid may pass; or the still may be constructed in compartments, and the cooling fluid caused to pass through one or more of them while the steam is generating vapors from liquid hydrocarbon in the others; or the cooling fluid, as water M, may be admitted through the pipe E, and discharged through a pipe, F, as shown in the drawing; or the still may be of tubular form, and the cooling fluid caused to pass through the tubes while the liquid hydrocarbon is being vaporized in the still, or vice versa.

When it is desired to vaporize liquid hydrocarbon requiring elevated temperature, the still K may be heated as is done in distilling petroleum; but in order to regulate and maintain the hydrocarbon at the proper temperature for producing gas of a given specific gravity and candle-power, I employ the cooling fluid; but I do not then employ the means of using the cooling liquid consisting of the water M, admitted through the pipe E, and discharged through the pipe F, but can use any of the other means described.

When it is desired, the gas produced may be mixed with wood, peat, or coal-gas in the hydraulic main.

I do not claim, in the process of manufacturing illuminating-gas hereinbefore described, the bringing of steam or other aeriform heated fluid into contact with the surface of a hydrocarbon liquid, whether heated or not below its surface, and kept in constant motion or not, as that is all old.

What I claim as new, and desire to secure by Letters Patent, is—

1. The process of manufacturing a fixed gas by bringing steam in contact with liquid hydrocarbon, cooled or refrigerated below its surface, thence conveying the mixed steam and hydrocarbon vapors into a heated retort, and there converting the mixture into a fixed gas, substantially as described.

2. The combination of the boiler A, still K, cooling or refrigerating coil X, and retort J, substantially as described.

In testimony that I claim the foregoing I have hereunto set my signature this 10th day of August, A. D. 1875.

JOHN ABSTERDAM.

Witnesses:
H. N. WINANS,
EDWIN GOODFELLOW.